United States Patent Office 3,322,692
Patented May 30, 1967

3,322,692
CATALYST COMPOSITION CONSISTING OF THE OXIDES OF COBALT, IRON AND RARE EARTH
Jared W. Clark, Charleston, W. Va., assignor to Union Carbide Corporation, a corporation of New York
No Drawing. Filed Aug. 30, 1963, Ser. No. 305,830
2 Claims. (Cl. 252—462)

This invention relates to halogen-exchange reactions and a catalyst therefor. It is particularly related to the reaction of chloroalkanes with hydrogen fluoride whereby one or more chlorine atoms are replaced by fluorine. More specifically, the present invention is concerned with a novel catalyst for effecting the said halogen-exchange reactions.

The reaction of chloroalkanes with hydrogen fluoride to produce fluorochloroalkanes is well known. The resulting fluorochloroalkanes are useful as aerosols, refrigerants, propellants, chemical intermediates, etc. These reactions are usually carried out in the presence of a catalyst such as chromium oxide, metal halide, iron oxide, etc. The use of these catalysts, however, is limited to specific halogen-exchange reactions and/or results in poor yields and productivities.

It has now been discovered that a mixture of oxides of cobalt, iron and a rare earth metal (which will hereinafter be defined) possesses excellent catalytic activity while it exhibits high degree of mechanical strength.

The novel catalyst which is employed in the halogen-exchange reactions of the present invention comprises a mixture of oxides of cobalt, iron and a rare earth metal. The rare earth oxide component can be employed either as a single component, such as, for example, lanthanum oxide, or more conveniently, it can be used as a mixture of rare earth oxide which is its usual form. Illustrative of a rare earth oxide mixture is didymium oxide. The term "didymium" applies to commercial mixtures of rare earth elements obtained from monazite sand by extraction followed by the elimination of cerium and thorium from the mixture. The term is used like that of an element in naming mixed oxides and salts. The approximate composition of didymium from monazite, expressed as rare earth oxides, is 44 to 46 percent lanthana ($La_2O_3$), 9 to 10 percent praseodymia ($Pr_6O_{11}$), 32 to 33 percent neodymia ($Nd_2O_3$), 5 to 6 percent samaria ($Sm_2O_3$), 3 to 4 percent gadolinia ($Gd_2O_3$), 0.4 percent yttrium earth oxide ($Y_2O_3$), 1 to 2 percent of other oxides. The term "didymium" has also been applied to mixtures of praseodymium and neodymium since such mixtures were once thought to be an element and assigned the symbol Di.

The chloroalkanes which can be satisfactorily employed in the present invention are those having 1 to 3 carbon atoms and containing at least two chlorine atoms in their molecular structure. Specific examples of suitable chloroalkanes are chloroform, carbon tetrachloride and hexachloroethane.

The halogen-exchange reactions of this invention are effected in the vapor phase at a temperature ranging from about 200° C. to 400° C., or higher. It is understood, of course, that the optimum reaction temperature depends upon the particular chloroalkane starting material and on other reaction conditions.

The reaction pressure is not narrowly critical and may be subatmospheric, atmospheric, or superatmospheric, though pressures ranging from about 100 p.s.i.g. to 200 p.s.i.g. are usually preferred in commercial operation.

The molar ratio of the reactants, i.e., the ratio of hydrogen fluoride to chloroalkane will vary depending upon the specific chloroalkane reactant, the degree of fluorination desired and on other reaction conditions. This ratio varies from about 1:1 to about 5:1, or even higher.

The residence time of the reaction also depends on the specific chloroalkane reactant, the degree of substitution desired and on other reaction conditions. Thus, the residence time can vary from a fraction of a second to several minutes, preferably from about 0.1 second to 10 minutes.

Although the present invention can be carried out in ordinary equipment, corrosion-resistant materials of construction such as stainless steel, nickel, etc., are preferred due to the corrosive nature of some of the materials which are present. The process of this invention can be carried out in batch-wise fashion, and is also readily amenable to continuous operation as it will become apparent from the examples which follow.

Examples 1 and 2 which follow illustrate methods of preparing the novel catalysts from the nitrates of the respective metals comprised in the catalyst. Other water-soluble salts of these metals such as the chlorides, fluorides, sulfates, etc., may also be used in the preparation of the catalyst. The resulting catalyst may contain variable amounts of water in the form of hydrous oxide of said metals; however most of this water is driven-off either in the course of conditioning the catalyst prior to its use, or during the halogen-exchange reactions of this invention. In any case, minor amounts of water retained on the catalyst are not narrowly critical in this invention since they are not detrimental to the successful utilization of the catalyst in these reactions.

As it was previously mentioned, the catalyst may contain variable amounts of water in the form of hydrous oxide, depending upon prior treatment of the catalyst. Thus, most of the water may be driven-off from the catalyst by heating the catalyst at elevated temperatures for a sufficient period of time. This, however, is not necessary since water will be driven-off during the halogen-exchange reactions without any detrimental effects upon the catalyst activity or the halogen-exchange reaction.

The catalyst may be employed in powdered form, granular form or pelleted form though the latter form is preferable. The particle size of the catalyst is not narrowly critical but it should be pointed out that too small a particle size results in excessive back pressure on the reactor whereas too large a particle size provides smaller catalyst surface for the reaction.

The following examples serve to illustrate methods of preparation of the novel catalyst and its utilization in several halogen-exchange reactions. These examples, however, are illustrative and do not limit the scope of the present invention.

*Example 1*

This example illustrates the preparation of a mixture of hydrous oxides of cobalt, iron and didymium.

Cobaltous nitrate [$Co(NO_3)_2 \cdot 6H_2O$], ferric nitrate [$Fe(NO3)_3 \cdot 9H_2O$] and didymium nitrate $$[di(NO3)_3 \cdot 6H_2O]$$

in the amounts of 757 grams, 162 grams and 437 grams respectively, were dissolved in 2500 ml. of water to form a solution of these nitrates. 600 ml. of ammonium hydroxide (28 percent $NH_3$) was diluted separately with 3 liters of water. The nitrates solution and 3.1 liters of the diluted ammonium hydroxide solution were fed continuously to a stainless steel vessel over a period of 30 minutes. The vessel was equipped with an agitator to secure adequate mixing of the feed solutions and the resulting slurry formed in the vessel. The feed rates of said solutions were adjusted so that the pH of the resulting slurry in the vessel was maintained between 8.5 and 9.5. After the 30 minutes period the slurry was filtered through two 32 cm. filters, and the residues on each filter were washed 4 times each with 4-liter portions of water. The resulting filter cakes were then slurried by the addition of sufficient quantity of water to produce a mobile paste. The paste was then poured into several pans and heated in an oven at 130° C. for 16 hours to dry the paste. Approximately 430 grams of granular gel were thus produced, which after screening to remove the fines, left approximately 350 grams of a 4 by 10 mesh material having the following composition:

| Compound: | Mole percent |
|---|---|
| Cobalt oxide | 78.8 |
| Didymium oxide | 6.0 |
| Ferric oxide | 15.2 |

*Example 2*

This example illustrates the preparation of a mixture of hydrous oxides of cobalt, iron and rare earth metal.

Cobaltous nitrate [$Co(NO_3)_2 \cdot 6H_2O$], ferric nitrate [$Fe(NO_3)_3 \cdot 9H_2O$] and rare earth nitrate in the amounts of 754 grams, 41 grams and 292 grams, respectively, were dissolved in 2100 ml. of water to form a solution of these nitrates. The rare earth materials employed were mixtures of rare earth metals having an average atomic weight of about 140 and containing lanthanum, yttrium, thorium and other rare earth elements having atomic numbers of from 58 to 71. 600 ml. of ammonium hydroxide solution (28 percent $NH_3$) was diluted with 3 liters of water. The nitrates solution and 3.4 liters of the diluted ammonium hydroxide solution was fed continuously to a stainless steel vessel containing 16 liters of water over a period of 20 minutes. The vessel as in Example 1 was equipped with an agitator to secure adequate mixing of the solutions and the resulting slurry formed in the vessel. The feed rates of said solutions were adjusted so that the pH of the resulting slurry in the vessel was maintained between 8.0 and 9.0. After a period of 20 minutes the slurry was filtered through two 32 cm. filters and the residues on each filter were washed 4 times each with 4-liter portions of water, the resulting filter cakes were then slurried by the addition of sufficient quantity of water to produce a mobile paste. The paste was then poured into several pans and heated in an oven at 130° C. for 16 hours to dry the paste. Approximately 345 grams of granular gel were thus produced which, after screening to remove the fines, left approximately 280 grams of 4 by 10 mesh material having the following compositions:

| Compound: | Mole percent |
|---|---|
| Cobalt oxide | 86.8 |
| Rare earth oxide | 11.5 |
| Ferric oxide | 1.7 |

The concentration of ammonium hydroxide which is required for the precipitation of the hydrous oxides is not necessarily limited to that shown in the previous two examples. Sufficient ammonia as ammonium hydroxide can be added to react stoichiometrically with the metal salts to form the hydrous oxides. Also, metal hydroxides such as, for example, lithium hydroxide, sodium hydroxide, potassium hydroxide can be used in lieu of ammonium hydroxide, but the latter is preferred.

The pH range which is effective for the precipitation of the hydrous metal oxides can vary from about 7.5 to about 11.

*Example 3*

Approximately 200 ml. of the catalyst prepared in Example 1 was charged to a 1-inch I.D. by 4 feet long nickel pipe reactor which was heated by means of a molten salt bath maintained at about 250° C. The catalyst temperature was raised to about 250° C. and a stream of nitrogen and hydrogen fluoride was passed over the heated catalyst for 30 minutes. The nitrogen feed was then discontinued and carbon tetrachloride and hydrogen fluoride were passed over the catalyst at the rates of 1.92 and 4.02 moles per hour, respectively, for 1 hour, at atmospheric pressure. The catalyst temperature during this period rose from 252° C. to 267° C. The reaction products were continuously removed from the reactor via an overhead line, scrubbed with water, dried over calcium chloride and collected in a refrigerated trap.

Approximately 1.61 mols of hydrogen chloride was produced per mole of carbon tetrachloride which was fed to the reactor. Also, 234 grams of product was collected in the refrigerated trap which upon gas chromatographic analysis showed the following composition:

| Compound: | Weight percent |
|---|---|
| $CClF_3$ | 1.4 |
| $CCl_2F_2$ | 69.8 |
| $CCl_3F$ | 27.9 |
| $CCl_4$ | 0.9 |
| | 100.0 |

*Example 4*

Approximately 200 ml. of the catalyst prepared by the procedure of Example 1 was charged to the reactor employed in Example 3. The catalyst temperature was raised to about 250° C. as in Example 3. A stream of nitrogen and hydrogen fluoride was passed over the heated catalyst for 30 minutes after which period the nitrogen feed was discontinued, and chloroform and hydrogen fluoride were passed over the catalyst at the rates of 1.77 and 3.5 moles per hour, respectively, for 1 hour, at atmospheric pressure. The catalyst temperature during this period rose from 251° C. to 258° C. The reaction products were continuously removed and treated as in Example 3. 148 grams of product was collected which upon gas chromatographic analysis showed the following composition:

| Compound: | Weight percent |
|---|---|
| $CHF_3$ | 3.9 |
| $CHClF_2$ | 60.5 |
| $CHCl_2F$ | 30.6 |
| $CHCl_3$ | 5.0 |
| | 100.0 |

*Example 5*

Approximately 200 ml. of the catalyst prepared by the procedure in Example 2 was charged to the reactor employed in Example 3. The catalyst temperature was raised to about 250° C. as in Example 3. A stream of nitrogen and hydrogen fluoride was passed over the heated catalyst for 30 minutes after which period the nitrogen feed was discontinued, and carbon tetrachloride and hydrogen fluoride were passed over the catalyst at the rates of 1.87 and 3.80 moles per hour, respectively, for one hour, at atmospheric pressure. The catalyst temperature during this period rose from 250° C. to 270° C. The reaction products were continuously removed and treated as in Example 3, 225 grams of product was collected having the following composition as indicated by gas chromatographic analysis:

| Compound: | Weight percent |
|---|---|
| $CClF_3$ | 0.0 |
| $CCl_2F_2$ | 87.2 |
| $CCl_3F$ | 12.6 |
| $CCl_4$ | 0.2 |
| | 100.0 |

*Example 6*

A series of runs were conducted wherein hydrogen fluoride and chloroform were passed over 200 ml. of catalyst charged to the reactor employed in Example 3. The composition of the catalyst was approximately 77 mole percent cobalt oxide, 20 mole percent didymium oxide and 3 mole percent iron oxide. The experimental procedure and the product recovery steps were similar to those in Example 3 and the product was analyzed by gas chromatographic method. The experimental conditions and the product composition are shown in Table 1 below:

TABLE 1

| Run No. | 1 | 2 | 3 |
|---|---|---|---|
| Feed rate, grams/hr.: | | | |
| CHCl₃ | 215 | 218 | 228 |
| HF | 76 | 73 | 79 |
| Moles HF/mole CHCl₃ | 2.1 | 2.0 | 2.06 |
| Duration of run, hour | 1.0 | 1.0 | 1.0 |
| Temperature of salt bath, °C | 225 | 250 | 275 |
| Maximum temperature of catalyst, °C | 228 | 255 | 280 |
| Reactor pressure, p.s.i.a. | 14.7 | 14.7 | 14.7 |
| Estimated residence time, seconds | 3.0 | 3.0 | 3.0 |
| Products recovered, grams | 164 | 164 | 163 |
| Product Composition, weight percent: | | | |
| CHCl₃ | 8.4 | 10.2 | 10.2 |
| CHCl₂F | 40.9 | 23.6 | 23.7 |
| CHClF₂ | 49.2 | 64.1 | 63.1 |
| CHF₃ | 1.5 | 2.1 | 3.0 |

It will be observed from the foregoing table that as the temperature is increased from 225° C. (Run No. 1) to 250° C. (Run No. 2), the yield of CHClF₂ (the most desirable reaction product) is increased. As the temperature is further increased to 275° C. (Run No. 3) the yield of CHClF₂ begins to drop but the yield of CHF₃ begins to increase.

*Example 7*

A series of runs were conducted to determine the effect of varying the catalyst composition on the activity of the catalyst and on the product distribution. Chloroform and hydrogen fluoride were passed over the catalyst and the products were recovered and analyzed by gas chromatographic method as in Example 3. The experimental conditions and the product compositions are shown in Table 2 below:

TABLE 2

| Run No. | 1 | 2 | 3 |
|---|---|---|---|
| Volume of catalyst, ml | 200 | 155 | 200 |
| Catalyst Composition, mole percent as oxide: | | | |
| Cobalt | 100 | 75 | 77 |
| Didymium | | 25 | 20 |
| Iron | | | 3 |
| Feed rate, grams/hr.: | | | |
| CHCl₃ | 227 | 171 | 218 |
| HF | 74 | 55 | 73 |
| Moles HF/Mole CHCl₃ | 1.95 | 1.93 | 2.0 |
| Duration of run, hour | 1.5 | 1.0 | 1.0 |
| Temperature of salt bath, °C | 250 | 252 | 250 |
| Maximum temperature of catalyst, °C | 253 | 252 | 255 |
| Reactor pressure, p.s.i.a. | 14.7 | 14.7 | 14.7 |
| Estimated residence time, seconds | 3.0 | 3.2 | 3.0 |
| Products recovered, grams | 274 | 125 | 164 |
| Product composition, weight percent: | | | |
| CHCl₃ | 12.9 | 10.2 | 10.2 |
| CHCl₂F | 74.0 | 74.4 | 23.6 |
| CHClF₂ | 12.9 | 15.1 | 64.1 |
| CHF₃ | 0.2 | 0.3 | 2.1 |
| Moles HCl produced/mole CHCl₃ fed | 1.06 | 1.10 | 1.63 |

*Example 8*

Approximately 250 ml. of catalyst prepared by the method of Example 1 was charged to the reactor employed in Example 3. Carbon tetrachloride and hydrogen fluoride were passed over the catalyst in the molar ratio and under conditions similar to those employed in Example 3. After 4 hours of operation the activity of the catalyst, measured in terms of the number of moles of hydrogen chloride produced per mole of carbon tetrachloride charged to the reactor, was determined to be 1.75.

1,1,1-Trichloro-2,2-difluoropropane and hydrogen fluoride in the amounts, respectively, of 200 grams/hour and 146 grams/hour were passed over the catalyst which had been heated to 350° C. at atmospheric pressure for a six-hour period. The effluent was treated as in Example 3 and the product analyzed by gas chromatographic method. The composition of the product was determined to be as follows:

| Compound: | Weight percent |
|---|---|
| 2,3,3,3-tetrafluoropropene | 38.3 |
| 3-chloro-2,3,3-trifluoropropene | 45.9 |
| 1,1-dichloro-1,2,2-trifluoropropane | 15.8 |

The activity of the catalyst was, once again, determined by passing carbon tetrachloride and hydrogen fluoride over the catalyst under the conditions described earlier in this example. It was observed that the activity of the catalyst had dropped from 1.75 to 1.52 moles of hydrogen chloride per mole of carbon tetrachloride which was fed to the reactor. The catalyst was reactivated by passing air over the catalyst at the rate of 24 to 30 liters per hour for 16 hours. The temperature of the catalyst was increased to 390° C. The air flow to the reactor was then discontinued and carbon tetrachloride and hydrogen fluoride were, once again, passed over the catalyst at the conditions hereinbefore described. The activity of the catalyst was thus raised from 1.52 to 1.74 moles of hydrogen chloride per mole of carbon tetrachloride fed to the reactor.

*Example 9*

An electrically-heated stainless steel reactor of 1½ inch I.D. and 5 feet long was charged with both chlorination and fluorination catalysts. The chlorination catalyst was a mixture of 80 mole percent cobalt oxide and 20 mole percent didymium oxide and the fluorination catalyst was a mixture of 77 mole percent cobalt oxide, 20 mole percent didymium oxide and 3 mole percent iron oxide, respectively. The volumes of the chlorination and fluorination catalysts were respectively, 0.02 and 0.01 cubic foot corresponding respectively to heights of 18 and 9 inches in the reactor. The chlorination catalyst was charged to the top section and the fluorination catalyst to the bottom section of the reactor, both catalyst beds being supported on ¼-inch nickel packing. The bottom section of the reactor was connected to a product recovery section containing a water and caustic scrubber, a product drier, condenser and a storage vessel. The catalysts were heated to about 250° C. by a stream of nitrogen at the rate of 2 to 5 cubic feet per hour. The nitrogen flow was then discontinued and hydrogen fluoride was introduced at the rate of 3.3 pounds per hour at a point below the packing which supports the chlorination catalyst. After a period of 30 minutes a mixture of 54.7 mole percent chlorine and 45.3 mole percent tetrachloroethylene was introduced at the top section of the reactor at a point above the bed of chlorination catalyst. The temperature of the chlorination catalyst was maintained at 300–315° C. and the temperature of the fluorination catalyst was maintained at 350–355° C. and the reactor pressure was maintained at 150 p.s.i.g. throughout this experiment. The reaction product was withdrawn from the bottom of the reactor and collected in the product recovery system. Samples of the product were analyzed by gas chromatographic method after 8, 12 and 16 hours of operation and were found to have the following compositions:

| Sample Composition, Weight Percent | After 8 hours | After 12 hours | After 16 hours |
|---|---|---|---|
| C₂Cl₂F₄ | 0.7 | 1.3 | 0.6 |
| C₂Cl₃F₃ | 71.9 | 74.6 | 68.5 |
| C₂Cl₄F₂ | 26.7 | 23.7 | 29.9 |
| C₂Cl₅F | 0.7 | 0.4 | 1.0 |

*Example 10*

Cobaltous nitrate [Co(NO₃)₂·6H₂O], ferric nitrate [Fe(NO₃)₃·9H₂O] and rare earth nitrate in the amounts of 61 grams, 1360 grams and 182 grams, respectively, were dissolved in 2100 ml. of water to form a solution of these nitrates. The rare earth materials employed were mixtures of rare earth metals having an average atomic weight of about 140 which include lanthanum, yttrium, thorium, etc. A dilute solution of ammonium hydroxide was prepared by mixing 200 ml. of ammonium hydroxide (28 percent NH₃) per liter of water. The two solutions were then fed continuously to a stainless steel vessel containing 16 liters of water. The vessel as in Example 1 was equipped with an agitator to secure adequate mixing of the solutions and the resulting slurry formed in the vessel. The feed rates of said solutions were adjusted so that the pH of the resulting slurry was maintained at about 7.5 to 8.5. The resulting slurry was then filtered through two 32 cm. filters and the residues on each filter were washed 4 times each with 4-liter portions of water, and the resulting filter cakes were then slurried by the addition of sufficient quantity of water to form a mobile paste. The paste was then poured into several pans and heated in an oven at 130° C. for 16 hours to dry the paste. The resulting granular materials were screened to obtain approximately 405 grams of 4 by 20 mesh material having the following composition:

| Compound: | Mole percent |
|---|---|
| Cobalt oxide | 10 |
| Rare earth oxide | 10 |
| Ferric oxide | 80 |

*Example 11*

Approximately 250 ml. of the catalyst prepared in Example 10 was charged to a 1-inch I.D. by 4 feet long nickel pipe reactor. The catalyst temperature was raised to about 250° C. by passing a hot stream of nitrogen and hydrogen fluoride (250–290° C.) for approximately 45 minutes. The nitrogen feed was then discontinued and chloroform and hydrogen fluoride were passed over the catalyst at the rates of 2.4 and 4.9 moles per hour respectively, for 1.5 hours at atmospheric pressure. The reaction products were continuously removed from the reactor via an overhead line, scrubbed with water, dried over calcium chloride and collected in a refrigerated trap. 314 grams of product was collected in the refrigerated trap which upon gas chromatographic analysis showed the following composition:

| Compound: | Weight percent |
|---|---|
| $CHF_3$ | 2.9 |
| $CHClF_2$ | 55.5 |
| $CHCl_2F$ | 34.5 |
| $CHCl_3$ | 7.1 |

*Example 12*

Cobaltous nitrate $[Co(NO_3)_2 \cdot 6H_2O]$, ferric nitrate $[Fe(NO_3)_3 \cdot 9H_2O]$ and rare earth nitrate in the amounts of 207 grams, 759 grams and 612 grams, respectively, were dissolved in 2500 ml. of water to form a solution of these nitrates. The rare earth materials employed were mixtures of rare earth metals having an average atomic weight of about 140 which include lanthanum, yttrium, thorium, etc. A dilute solution of ammonium hydroxide was prepared by mixing 200 ml. of ammonium hydroxide (28 percent $NH_3$) per liter of water. The nitrates solution and 3850 ml. of the diluted ammonium hydroxide solution were fed continuously to a stainless steel vessel containing 16 liters of water. The procedure of Example 10 was then followed, and approximately 310 grams of 4 by 20 mesh material were recovered having the following composition:

| Compound: | Mole percent |
|---|---|
| Cobalt oxide | 30 |
| Rare earth oxide | 30 |
| Ferric oxide | 40 |

*Example 13*

Approximately 220 ml. of the catalyst prepared in Example 12 was charged to a 1-inch I.D. by 4 feet long nickel pipe reactor. The procedure of Example 11 was followed except that the feed rates of chloroform and hydrogen fluoride were 2.1 and 4.4 moles per hour. The catalyst temperature varied from 250° to 260° C., the pressure in the reactor was atmospheric and the duration of the run was approximately 2 hours. The product upon gas chromatographic analysis showed the following composition:

| Compound: | Weight percent |
|---|---|
| $CHF_3$ | 2.5 |
| $CHClF_2$ | 68.3 |
| $CHCl_2F$ | 23.7 |
| $CHCl_3$ | 5.5 |

From the foregoing examples it can be observed that the composition of the novel catalyst can vary over a relatively wide range depending upon the specific chloroalkane which is employed, the ratio of the reactants, the desired products distribution, etc. This cobalt oxide in the catalyst can range from about 30 weight percent, or less, to about 90 weight percent, or more, iron oxide can vary from about 1 weight percent to about 85 weight percent, or more, and rare earth oxide can vary from about 5 weight percent to about 40 weight percent or more. The optimum composition for a particular reaction can be selected by those skilled in the art from the teachings herein. It should be pointed out, however, that iron oxide reacts with chlorine or some of the chloroalkanes to produce iron chloride which is volatile under the reaction conditions employed herein and which deposits in the overhead transfer lines as solids thereby causing operational difficulties. In these circumstances it is advisable to maintain the iron oxide content of the catalyst at a relatively low level, say, below about 15 weight percent to minimize this difficulty.

What is claimed is:

1. A novel catalyst composition consisting essentially of from about 30 weight percent to about 90 weight percent cobalt oxide, from about 1 weight percent to about 85 weight percent iron oxide and from about 5 weight percent to about 40 weight percent rare earth oxide.

2. The novel catalyst composition of claim 1 wherein said rare earth metal oxide is didymium oxide.

References Cited

UNITED STATES PATENTS

| 1,207,706 | 12/1916 | Bosch et al. | 252—462 X |
| 2,005,707 | 6/1935 | Daudt et al. | 260—653.7 |
| 2,734,874 | 2/1956 | Drake et al. | 252—461 |
| 2,870,224 | 1/1959 | Scherer | 260—653.7 |
| 2,981,762 | 4/1961 | Woolf | 260—653.7 |
| 3,055,842 | 9/1962 | Robinson | 252—461 |

OSCAR R. VERTIZ, *Primary Examiner.*

LEON ZITVER, *Examiner.*

D. D. HORWITZ, G. T. OZAKI, *Assistant Examiners.*